(12) United States Patent
Shumlak et al.

(10) Patent No.: US 11,219,117 B2
(45) Date of Patent: Jan. 4, 2022

(54) PLASMA CONFINEMENT SYSTEM WITH OUTER ELECTRODE HAVING LIQUIFIABLE MATERIAL AND METHODS FOR USE

(71) Applicants: UNIVERSITY OF WASHINGTON, Seattle, WA (US); LAWRENCE LIVERMORE NATIONAL SECURITY, LLC, Livermore, CA (US)

(72) Inventors: Uri Shumlak, Seattle, WA (US); Harry S. McLean, Seattle, WA (US); Brian A. Nelson, Seattle, WA (US)

(73) Assignees: Lawrence Livermore National Security, LLC, Livermore, CA (US); University of Washington, Seattle, WA (US)

( * ) Notice: Subject to any disclaimer, the term of this patent is extended or adjusted under 35 U.S.C. 154(b) by 0 days.

(21) Appl. No.: 16/619,895

(22) PCT Filed: Jun. 7, 2018

(86) PCT No.: PCT/US2018/036388
§ 371 (c)(1),
(2) Date: Dec. 5, 2019

(87) PCT Pub. No.: WO2018/226914
PCT Pub. Date: Dec. 13, 2018

(65) Prior Publication Data
US 2020/0168350 A1     May 28, 2020

Related U.S. Application Data

(60) Provisional application No. 62/516,508, filed on Jun. 7, 2017.

(51) Int. Cl.
*H05H 1/06* (2006.01)
*G21B 1/21* (2006.01)
(Continued)

(52) U.S. Cl.
CPC ............... *H05H 1/06* (2013.01); *G21B 1/05* (2013.01); *G21B 1/21* (2013.01); *H05H 1/16* (2013.01);
(Continued)

(58) Field of Classification Search
CPC . G21B 1/057; G21B 1/21; G21B 1/05; G21B 1/11; H05H 1/16; H05H 1/54; H05H 1/06; Y02E 30/10
(Continued)

(56) References Cited

U.S. PATENT DOCUMENTS

| 3,309,873 A | 3/1967 | Cann |
| 4,129,772 A | 12/1978 | Navratil et al. |

(Continued)

FOREIGN PATENT DOCUMENTS

JP    H06-196298 A    7/1994

OTHER PUBLICATIONS

Forbes, E. G. et al., "Progress Toward a Compact Fusion Reactor Using the Sheared-Flow-Stabilized Z-Pinch," Fusion Science and Technology, vol. 75, p. 599-607, Oct. 2019.
(Continued)

*Primary Examiner* — Darlene M Ritchie
(74) *Attorney, Agent, or Firm* — McDonnell Boehnen Hulbert & Berghoff LLP

(57) ABSTRACT

An example plasma confinement system includes an inner electrode having a rounded first end that is disposed on a longitudinal axis of the plasma confinement system and an outer electrode that at least partially surrounds the inner electrode. The outer electrode includes a solid conductive
(Continued)

shell and an electrically conductive material disposed on the solid conductive shell and on the longitudinal axis of the plasma confinement system. The electrically conductive material has a melting point within a range of 170° C. to 800° C. at 1 atmosphere of pressure. Related plasma confinement systems and methods are also disclosed herein.

20 Claims, 10 Drawing Sheets

(51) Int. Cl.
  H05H 1/54      (2006.01)
  G21B 1/05      (2006.01)
  H05H 1/16      (2006.01)
  G21B 1/11      (2006.01)
  G21B 1/17      (2006.01)
(52) U.S. Cl.
  CPC ............... *H05H 1/54* (2013.01); *G21B 1/11* (2013.01); *G21B 1/115* (2013.01); *G21B 1/17* (2013.01); *Y02E 30/10* (2013.01)
(58) Field of Classification Search
  USPC .................................. 315/111.21, 31, 71, 81
  See application file for complete search history.

(56) References Cited

U.S. PATENT DOCUMENTS

| | | | |
|---|---|---|---|
| 6,051,841 | A | 4/2000 | Partlo |
| 6,744,060 | B2 | 6/2004 | Ness et al. |
| 6,804,327 | B2* | 10/2004 | Schriever ............... B03C 3/383 250/493.1 |
| 7,115,887 | B1 | 10/2006 | Hassanein et al. |
| 7,372,059 | B2 | 5/2008 | Shumlak et al. |
| 8,891,719 | B2 | 11/2014 | Howard et al. |
| 9,267,515 | B2 | 2/2016 | Suponitsky et al. |
| 9,596,745 | B2* | 3/2017 | Laberge ................... H05H 1/16 |
| 2004/0160155 | A1* | 8/2004 | Partlo ..................... H01S 3/225 313/231.31 |
| 2006/0198486 | A1* | 9/2006 | Laberge ................. F15B 21/12 376/150 |
| 2007/0085042 | A1 | 4/2007 | Shumlak et al. |
| 2010/0215136 | A1 | 8/2010 | Rusnak et al. |
| 2011/0026657 | A1 | 2/2011 | Laberge et al. |
| 2013/0127376 | A1* | 5/2013 | Heid ........................ H05H 5/06 315/506 |
| 2014/0247913 | A1 | 9/2014 | Laberge et al. |
| 2015/0216028 | A1* | 7/2015 | Laberge ................... G21B 3/00 315/111.61 |
| 2019/0139650 | A1* | 5/2019 | Laberge ................... G21B 1/05 |

OTHER PUBLICATIONS

The International Search Report (ISR) with Written Opinion for PCT/US2018/036388 dated Aug. 23, 2018, pp. 1-10.
Mas De Les Valls, E. et al. "Lead-lithium eutectic material database for nuclear fusion technology" Journal of Nuclear Materials ,vol. 376, Issue 3, Jun. 2008, pp. 353-357 <URL:https://www.sciencedirect.com/science/article/pii/S0022311508000809>, entire document.
Arber, T.D. et al., "The effect of sheared axial flow on the linear stability of the Z-pinch," Physics of Plasmas 3:2, 554-560 (1996).
Belan, V. G., et al., "Experimental study of a quasistationary plasma accelerator fed from inductive and capacitive storage devices," Soviet Journal of Plasma Physics 16(2), 96 (1990).
Bennett, W. H. "Magnetically Self-Focussing Streams," Physical Review 45, 890 (1934).
Braginskii, S. I., "Transport Processes in a Plasma," Reviews of Plasma Physics, vol. 1, edited by M. A. Leontovich (Consultants Bureau, New York, NY, 1965) pp. 205-311.
Burrell, K. H., "Effects of ExB velocity shear and magnetic shear on turbulence and transport in magnetic confinement devices," Physics of Plasmas 4, 1499 (1997).
Deeney, C., "Enhancement of X-Ray Power from a Z Pinch Using Nested-Wire Arrays," Phys. Rev. Lett. 81:22, 4883 (1998).
Den Hartog, D.J. et al., "Telecentric viewing system for light collection from a z-pinch plasma," Review of Scientific Instruments 72:4, 2224 (2001).
DeSouza-Machado, S. et al., "Stabilization of Z pinch by velocity shear," Physics of Plasmas 7:11, 4632-4643 (2000).
Freidberg, J. P., "Ideal magnetohydrodynamic theory of magnetic fusion systems," Reviews of Modern Physics 54:3, 801 (1982).
Golingo, R., "Formation of a Sheared Flow Z-Pinch," 2003. University of Washington, PhD dissertation https://www.aa.washington.edu/sites/aa/files/research/ZaP/publications/PhDthesis_golingo.pdf.
Golingo, R. P. et al., "Formation of a sheared flow Z pinch," Physics of Plasmas 12:06, 062505 (2005).
Gomez, M.R. et al., "Experimental Demonstration of Fusion-Relevant Conditions in Magnetized Liner Inertial Fusion," Physical Review Letters 113, 155003 (2014).
Haines, M. G., "A review of the dense Z-pinch," Plasma Physics and Controlled Fusion, 53, 093001 (2011).
Jackson, S. L. et al., "Abel inversion of a holographic interferogram for determination of the density profile of a sheared-flow pinch," Review of Scientific Instruments 77, 083502 (2006).
Kadomtsev, B. B., "Hydromagnetic Stability of a Plasma," Reviews of Plasma Physics, vol. 2, edited by M. A. Leontovich (Consultants Bureau, New York, NY, 1966) pp. 153-198.
Knecht, S. D. et al., "Calculation of the Equilibrium Evolution of the ZaP Flow Z-Pinch Using a Four-Chord Interferometer," IEEE Transactions on Plasma Science 43, 2469 (2015).
Knecht, S.D. et al., "Effects of a Conducting Wall on Z-Pinch Stability," IEEE Transactions on Plasma Science 42:6, 1531 (2014).
Kruskal, M. et al., "Some instabilities of a completely ionized plasma," Proceedings of the Royal Society of London A 223, 348 (1954).
Leontovich, M.A. "Forces acting on a linear current within a conducting cylindrical tube," Plasma Physics and the Problem of Controlled Thermonuclear Reactions, vol. 1 (Pergamon Press, New York, NY, 1961) pp. 129-143.
Lindemuth, I. R. et al., "Parameter space for magnetized fuel targets in inertial confinement fusion," Nuclear Fusion 23, 263 (1983).
Loebner, K. T. K. et al., "Evidence of Branching Phenomena in Current-Driven Ionization Waves," Physical Review Letters 115, 175001 (2015).
Makhin, V. et al., "Self-organization observed in numerical simulations of a hard-core diffuse Z pinch," Physics of Plasmas 12, 042312 (2005).
Maron, Y. et al., "Pressure and Energy Balance of Stagnating Plasmas in z-Pinch Experiments: Implications to Current Flow at Stagnation," Phys. Rev. Lett. 111, 035001 (2013).
McBride, R. D. et al., "Implosion dynamics and radiation characteristics of wire-array Z pinches on the Cornell Beam Research Accelerator," Physics of Plasmas 16, 012706 (2009).
Mikitchuk, D. et al., "Mitigation of Instabilities in a Z-Pinch Plasma by a Preembedded Axial Magnetic Field," IEEE Transactions on Plasma Science 42:10, 2524 (2014).
Morozov, A. I., "Principles of coaxial (quasi-) steady-state plasma accelerators," Soviet Journal of Plasma Physics 16 (2), 69 (1990).
National Research Council, "Frontiers in High Energy Density Physics: The X-Games of Contemporary Science," Washington, DC: The National Academies Press, 2003 https://doi.org/10.17226/10544.
Newcomb, A., "Hydromagnetic Stability of a Diffuse Linear Pinch" Annals of Physics 10, 232-267 (1960).
Newton, A. A. et al., "High-Density Plasmas and Accelerators" Proceedings of the Third European Conference on Controlled Fusion and Plasma Physics, IAEA, Utrecht, vol. II (1969) p. 119.
Peterkin Jr., R. E. et al., "Transport of Magnetic Flux in an Arbitrary Coordinate ALE Code," Journal of Computational Physics 140, 148-171 (1998).
Ross, M. P. "Exploring plasma stability and confinement with high resolution density measurements on the ZaP-HD Flow Z-Pinch,"

(56) References Cited

OTHER PUBLICATIONS

PhD dissertation, University of Washington, published Feb. 14, 2017 [retrieved Jun. 28, 2018 via the internet at <http://hdl.handle.net/1773/38055>] p. 1, 15-19, 25, 31-39.

Ross, M. P. et al., "Digital holographic interferometry employing Fresnel transform reconstruction for the study of flow shear stabilized Z-pinch plasmas," Review of Scientific Instruments 87, 103502 (2016).

Sefkow, A. B. et al., "Design of magnetized liner inertial fusion experiments using the Z facility," Physics of Plasmas 21, 072711 (2014).

Sethian, J. D. et al., "Enhanced Stability and Neutron Production in a Dense Z-Pinch Plasma Formed from a Frozen Deuterium Fiber," Phys. Rev. Lett. 59:8, 892 (1987).

Shafranov, V. D., "The Stability of a Cylindrical Gaseous Conductor in a Magnetic Field," Soviet Journal of Atomic Energy 1:5, 709-713 (1956).

Sheehey, P. et al., "Two-dimensional direct simulation of deuterium-fiber-initiated Z pinches with detailed comparison to experiment," Physics of Fluids B 4 (11), 3698 (1992).

Shumlak, U. et al., "Equilibrium, flow shear and stability measurements in the Z-pinch," Nuclear Fusion 49, 075039 (9pp) (2009).

Shumlak, U. et al., "Evidence of Stabilization in the Z-Pinch," Physical Review Letters 87:20, 205005 (2001).

Shumlak, U. et al., "High energy density Z-pinch plasmas using flow stabilization," AIP 9th International Conference on Dense Z Pinches, AIP Conf. Proc. vol. 1639, Issue 1, 76-79 (2014).

Shumlak, U. et al., "Increasing plasma parameters using sheared flow stabilization of a Z-pinch," Physics of Plasma 24, 055702 (2017).

Shumlak, U. et al., "Sheared flow stabilization experiments in the ZaP flow Z pinch," Physics of Plasmas 10:5, 1683 (2003).

Shumlak, U. et al., "Sheared Flow Stabilization of the m=1 Kink Mode in Z Pinches," Physical Review Letters 75, 3285 (1995).

Shumlak, U. et al., "The sheared-flow stabilized Z-pinch," Transactions of Fusion and Science and Technology 61, 119-124 (2012).

Sinars, D. B. et al., "The Role of Magnetized Linder Inertial Fusion as a Pathway to Fusion Energy," Journal of Fusion Energy 35, 78-84 (2016).

Slutz, S. A. et al., "Pulsed-power-driven cylindrical liner implosions of laser preheated fuel magnetized with an axial field," Physics of Plasmas 17, 056303 (2010).

Spielman, R. B. et al., "Wire-array z pinches as intense x-ray sources for inertial confinement fusion," Plasma Physics and Controlled Fusion 42, B157 (2000).

Terry, P. W., "Suppression of turbulence and transport by sheared flow," Reviews of Modern Physics 72:1, 109 (2000).

Turchi, P. J. et al., "Generation of high-energy plasmas by electromagnetic implosion," Journal of Applied Physics 44, 4936 (1973).

The International Search Report (ISR) for PCT/US2018/019364 dated Jul. 10, 2018, pp. 1-3.

Written Opinion of the International Searching Authority for PCT/US2018/019364 dated Jul. 10, 2018, pp. 1-7.

Communication dates Nov. 3, 2020 with Supplementary European Search Report completed Oct. 23, 2020 for European Patent Application No. 18757877.8 filed on Sep. 4, 2019, 13 pages.

Den Hartog, D. J., et al., "The ZaP Flow Z-Pinch: Plasma Flow Shear and Stability," Fusion Science and Technology, 47:1T, 134-137.

Fearn, D. G., et al., "The conical z-pinch plasma gun," Brit. J. Appl. Phys., 1967, vol. 18, 2013.

* cited by examiner

PLASMA CONFINEMENT SYSTEM WITH OUTER ELECTRODE HAVING LIQUIFIABLE MATERIAL AND METHODS FOR USE

CROSS-REFERENCE TO RELATED APPLICATION

This application is a U.S. national phase of International Application No. PCT/US2018/036388, filed on Jun. 7, 2018, which claims priority to U.S. Provisional Application No. 62/516,508, filed Jun. 7, 2017, both of which are incorporated by reference herein in their entirety.

FEDERAL FUNDING STATEMENT

This invention was made with government support under Grant Nos. DE-AC52-07NA27344 and DE-AR0000571, awarded by the Department of Energy (DOE). The government has certain rights in the invention.

BACKGROUND

Unless otherwise indicated herein, the materials described in this section are not prior art to the claims in this application and are not admitted to be prior art by inclusion in this section.

Nuclear fusion is the process of combining two nuclei. When two nuclei of elements with atomic numbers less than that of iron are fused, energy is released. The release of energy is due to a slight difference in mass between the reactants and the products of the fusion reaction and is governed by $\Delta E = \Delta mc^2$. The release of energy is also dependent upon the attractive strong nuclear force between the reactant nuclei overcoming the repulsive electrostatic force between the reactant nuclei.

The fusion reaction requiring the lowest plasma temperature occurs between deuterium (a hydrogen nucleus with one proton and one neutron) and tritium (a hydrogen nucleus having one proton and two neutrons). This reaction yields a helium-4 nucleus and a neutron.

One approach for achieving nuclear fusion is to energize a gas containing fusion reactants inside a reactor chamber. The energized gas becomes a plasma via ionization. To achieve conditions with sufficient temperatures and densities for fusion, the plasma needs to be confined.

SUMMARY

A first aspect of the disclosure is a plasma confinement system that includes an inner electrode having a rounded first end that is disposed on a longitudinal axis of the plasma confinement system and an outer electrode that at least partially surrounds the inner electrode. The outer electrode includes a solid conductive shell and an electrically conductive material disposed on the solid conductive shell and on the longitudinal axis of the plasma confinement system. The electrically conductive material has a melting point within a range of 170° C. to 800° C. at 1 atmosphere of pressure.

A second aspect of the disclosure is a method for operating a plasma confinement system. The plasma confinement system includes an inner electrode having a rounded first end that is disposed on a longitudinal axis of the plasma confinement system and an outer electrode that at least partially surrounds the inner electrode. The method includes flowing gas into the plasma confinement system and applying, via a power supply, a voltage between the inner electrode and the outer electrode, thereby converting at least a portion of the gas into a Z-pinch plasma that flows between (i) an electrically conductive material disposed on a solid conductive shell of the outer electrode and on the longitudinal axis of the plasma confinement system and (ii) the rounded first end of the inner electrode. The electrically conductive material has a melting point within a range of 170° C. to 800° C. at 1 atmosphere of pressure. The method also includes moving a first liquid portion of the electrically conductive material out of the plasma confinement system. The first liquid portion of the electrically conductive material is heated via reaction products of the Z-pinch plasma.

A third aspect of the disclosure is a plasma confinement system that includes an inner electrode, an intermediate electrode that at least partially surrounds the inner electrode, and an outer electrode that at least partially surrounds the intermediate electrode. The outer electrode includes a solid conductive shell and an electrically conductive material disposed on the solid conductive shell. The electrically conductive material has a melting point within a range of 180° C. to 800° C. at 1 atmosphere of pressure.

A fourth aspect of the disclosure is a method for operating a plasma confinement system. The plasma confinement system includes an inner electrode, an intermediate electrode that at least partially surrounds the inner electrode, and an outer electrode that at least partially surrounds the intermediate electrode. The method includes flowing gas into an acceleration region between the inner electrode and the intermediate electrode and applying, via a first power supply, a voltage between the inner electrode and the intermediate electrode, thereby converting at least a portion of the gas into a plasma having a substantially annular cross section, the plasma flowing axially within the acceleration region toward a first end of the inner electrode and a first end of the outer electrode. The method also includes applying, via a second power supply, a voltage between the inner electrode and the outer electrode to establish a Z-pinch plasma that flows between (i) an electrically conductive material disposed on a solid conductive shell of the outer electrode and (ii) the first end of the inner electrode. The electrically conductive material has a melting point within a range of 180° C. to 800° C. at 1 atmosphere of pressure. The method also includes moving a first liquid portion of the electrically conductive material out of the plasma confinement system. The first liquid portion of the electrically conductive material is heated via reaction products of the Z-pinch plasma.

When the term "substantially" or "about" is used herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide. In some examples disclosed herein, "substantially" or "about" means within +/−5% of the recited value.

These, as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible.

DETAILED DESCRIPTION

Various embodiments of plasma confinement systems and methods for their use are disclosed herein. The disclosed embodiments, when compared to existing systems and methods, may facilitate increased plasma stability, more robust sheared plasma flow, smaller Z-pinch plasma radii, higher magnetic fields, and/or higher plasma temperature. Some of the disclosed embodiments exhibit independent control of plasma acceleration and plasma compression as well.

An additional feature of some of the disclosed embodiments includes one or more electrodes with a liquid electrode material disposed thereon (e.g., disposed on a longitudinal axis of the plasma confinement system). The liquid electrode material can absorb and transfer heat from the plasma discharge, provide neutron shielding, breed additional tritium, provide additional vacuum pumping, and provide a tritium recovery medium. Use of the liquid electrode material can help mitigate problems such as the damage of (solid) electrodes caused by the heat of the plasma discharge. The liquid electrode material can also be circulated within the vacuum chamber (e.g., over a weir wall) such that the liquid electrode material has an azimuthal and/or axial component to its flow within the vacuum chamber.

Figure 1:
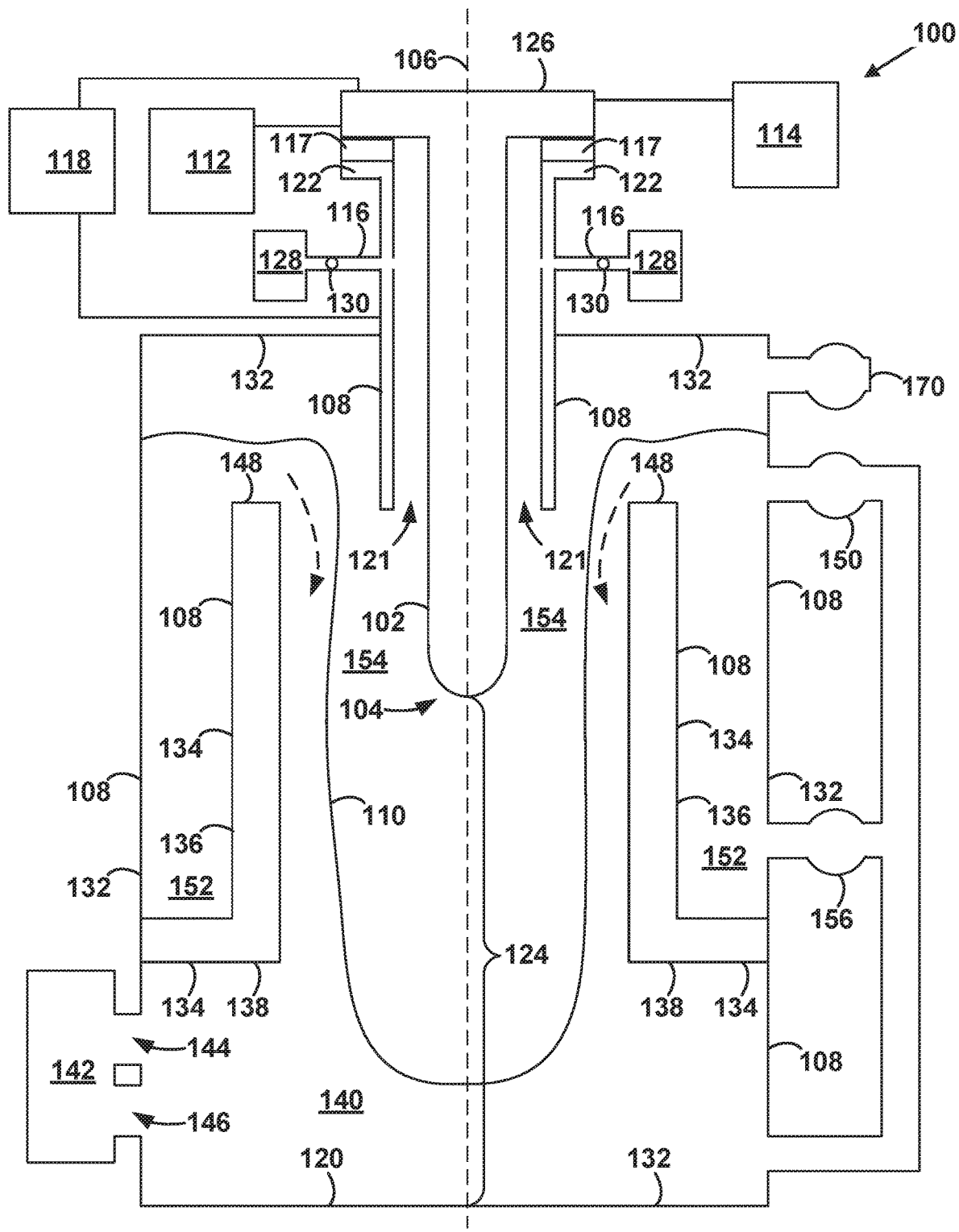
FIG. 1 is a schematic cross-sectional diagram of a plasma confinement system, according to an example embodiment.

FIG. 1 is a schematic cross-sectional diagram of a plasma confinement system 100. The plasma confinement system 100 includes an inner electrode 102 having a rounded first end 104 that is disposed on a longitudinal axis 106 (e.g., an axis of cylindrical symmetry) of the plasma confinement system 100. The plasma confinement system 100 also includes an outer electrode that at least partially surrounds the inner electrode 102. The outer electrode includes a solid conductive shell 108 and an electrically conductive material 110 disposed on the solid conductive shell 108 and on the longitudinal axis 106 of the plasma confinement system 100. The electrically conductive material 110 has a melting point within a range of 170° C. to 800° C. (e.g., 180° C. to 550° C.) at 1 atmosphere of pressure. In various examples, the electrically conductive material 110 can the take the form of eutectics, alloys, or mixtures of one or more of lithium, lead, or tin.

The inner electrode 102 generally takes the form of an electrically conducting shell (e.g., formed of one or more of stainless steel, molybdenum, tungsten, or copper) having a substantially cylindrical body. The inner electrode 102 includes a first end 104 (e.g. a rounded end) and an opposing second end 126 (e.g., a substantially disc-shaped end). The first end 104 could be formed of a carbon-based material such as graphite or carbon fiber, or one or more of stainless steel, molybdenum, tungsten, or copper, for example. In some embodiments, the inner electrode 102 has a coating on its outer surface that includes an electrically conductive material having a melting point within a range of 180° C. to 800° C. (e.g., 180° C. to 550° C.) at 1 atmosphere of pressure. In various examples, the electrically conductive material can the take the form of eutectics, alloys, or mixtures of one or more of lithium, lead, or tin. Alternatively, the electrically conductive material can the take the form of elemental lithium, lead, or tin.

The plasma confinement system 100 further includes a feeding mechanism 112 (e.g., an electromechanical system) that is configured to move the inner electrode 102 in or out of the plasma confinement system 100 along the longitudinal axis 106. During operation, the inner electrode 102 may become eroded by plasma discharge and the feeding mechanism 112 can be operated to feed in the inner electrode 102 to maintain the relative spacing between the inner electrode 102 and other components of the plasma confinement system 100.

The plasma confinement system 100 further includes a cooling system 114 (e.g., a heat exchanger) that is configured to cool the inner electrode 102 during operation of the plasma confinement system 100.

The outer electrode generally takes the form of an electrically conducting (e.g., stainless steel) shell having a substantially cylindrical body. The solid conductive shell 108 of the outer electrode includes a solid conductive outer shell 132 and a solid inner shell 134 (e.g., formed of electrically conductive material or high-resistivity material such as silicon carbide) that is disposed within the solid conductive outer shell 132 and in contact with the solid conductive outer shell 132. More specifically, the solid inner shell 134 includes an axial wall 136 that at least partially encircles the longitudinal axis 106 of the plasma confinement system 100 (e.g., partially encircles the inner electrode 102) and a radial wall 138 that couples the axial wall 136 to the solid conductive outer shell 132.

The outer electrode includes a first end 120 and an opposing second end 122. The rounded first end 104 of the inner electrode 102 is between the first end 120 (e.g., a substantially disc-shaped end) of the outer electrode and the second end 122 (e.g., a substantially annular end) of the outer electrode. The radial wall 138 and a first end 120 of the outer electrode form a pool region 140 within the plasma confinement chamber 100. The pool region 140 serves as a reservoir for a substantial amount of the (e.g., liquid) electrically conductive material 110 that is in the plasma confinement chamber 100. As shown, the electrically conductive material 110 can also be circulated over the end 148 of the axial wall 136 by a pump 150 and/or a pump 156 as is discussed in more detail below.

The outer electrode (i.e., the solid conductive shell 108 and the electrically conductive material 110) surrounds much of the inner electrode 102. The inner electrode 102 and the outer electrode may be concentric and have radial symmetry with respect to the longitudinal axis 106.

The plasma confinement system 100 also includes a heat exchanger 142, a first port 144 configured to guide the electrically conductive material 110 from the heat exchanger 142 into the pool region 140, and a second port 146 configured to guide the electrically conductive material 110 from the pool region 140 to the heat exchanger 142. The heat exchanger 142 is configured to receive, via the second port 146, the electrically conductive material 110 that is heated within the plasma confinement system 100, extract heat from the electrically conductive material 110, and move (e.g., pump) the electrically conductive material 110 back into the pool region 140 via the first port 144 to be heated again by fusion reactions that take place in the plasma confinement system 100. In FIG. 1, the first port 144 is shown above the second port 146, however, in other examples the second port 146 could be above the first port 144. One of skill in the art will recognize that, in various examples, the ports 144 and 146 can have various relative positions.

As noted above, the axial wall 136 includes an end 148 that faces the second end 122 of the outer electrode. The plasma confinement system 100 also includes a first pump 150 configured to move the electrically conductive material 110 from the pool region 140 to a region 152 that is outside the axial wall 136 and separated from the pool region 140 by the radial wall 138. The first pump 150 is configured to move the electrically conductive material 110 over the end 148 of the axial wall 136 to a region 154 inside the axial wall 136.

The plasma confinement system 100 also includes a second pump 156 configured to move the electrically conductive material 110 from the pool region 140 to the region 152 that is outside the axial wall 136 and separated from the pool region 140 by the radial wall 138.

The plasma confinement system 100 also includes a pump 170 (e.g., a turbo-molecular pump) configured to pump air out of the plasma confinement system 100 such that the base pressure within the plasma confinement system 100 is within the range of $10^{-5}$ to $10^{-8}$ Torr.

The plasma confinement system 100 also includes one or more gas ports 116 configured to direct gas (e.g., tritium, deuterium, helium-3, hydrogen, a boron containing gas, or borane) from a gas source 128 (e.g., a pressurized gas tank) into an acceleration region 121 that is radially between the inner electrode 102 and the outer electrode. The acceleration region 121 has a substantially annular cross section defined by the shapes of the inner electrode 102 and the solid conductive shell 108. As shown in FIG. 1, the one or more gas ports 116 are positioned axially between the first end 104 of the inner electrode 102 and the second end 126 of the inner electrode 102.

The plasma confinement system 100 also includes a power supply 118 configured to apply a voltage between the inner electrode 102 and the outer electrode (e.g., the solid conductive shell 108). The power supply 118 will generally take the form of a capacitor bank capable of storing up to 500 kJ or up to 3-4 MJ, for example. A positive terminal of the power supply 118 can be coupled to the inner electrode 102 or alternatively to the outer electrode (e.g., the solid conductive shell 108).

The plasma confinement system 100 includes an assembly region 124 within the outer electrode between the first end 104 of the inner electrode 102 and the first end 120 of the outer electrode. The plasma confinement system 100 is configured to sustain a Z-pinch plasma within the assembly region 124 as described below.

The plasma confinement system 100 also includes an insulator 117 between the second end 122 of the outer electrode (e.g., the solid conductive shell 108) and the inner electrode 102 to maintain electrical isolation between the inner electrode 102 and the outer electrode. The insulator 117 (e.g., a ceramic material) generally has an annular cross section.

Figure 2:
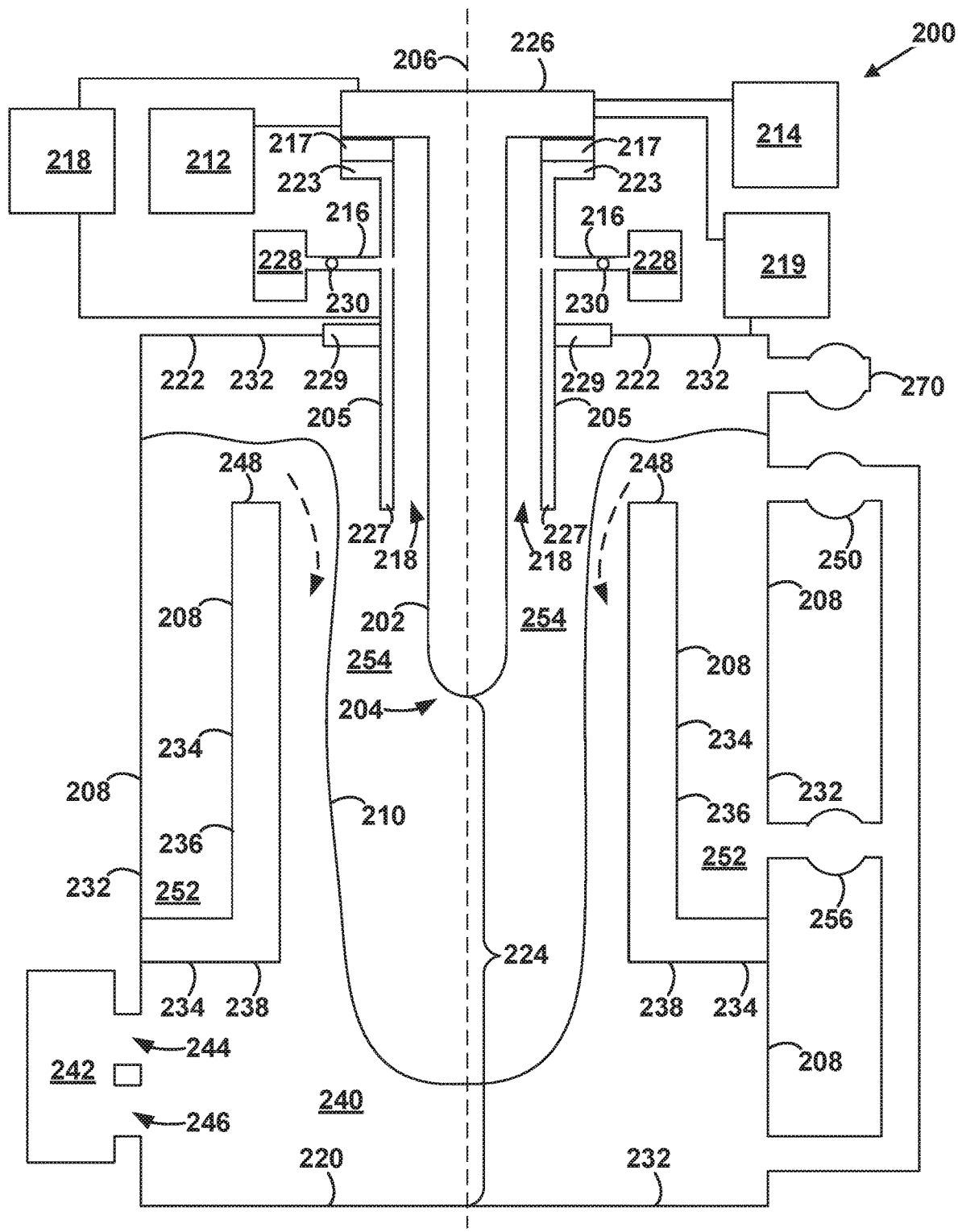
FIG. 2 is a schematic cross-sectional diagram of a plasma confinement system, according to an example embodiment.

FIG. 2 is a schematic cross-sectional diagram of a plasma confinement system 200. The plasma confinement system 200 can have any of the features of the plasma confinement system 100, with differences described below. One difference between the plasma confinement system 100 and the plasma confinement system 200 is the presence of the intermediate electrode 205 as part of the plasma confinement system 200 as described below.

The plasma confinement system 200 includes an inner electrode 202, an intermediate electrode 205 (e.g., a substantially annular electrode) that at least partially surrounds the inner electrode 202, and an outer electrode that at least partially surrounds the intermediate electrode 205. The outer electrode includes a solid conductive shell 208 and an electrically conductive material 210 disposed on the solid conductive shell 208 (e.g., on the longitudinal axis 206). The electrically conductive material 210 has a melting point within a range of 180° C. to 800° C. (e.g., 180° C. to 550° C.) at 1 atmosphere of pressure. In various examples, the electrically conductive material 210 can the take the form of eutectics, alloys, or mixtures of one or more of lithium, lead, or tin.

The inner electrode 202 generally takes the form of an electrically conducting shell (e.g., formed of one or more of stainless steel, molybdenum, tungsten, or copper) having a substantially cylindrical body. The inner electrode 202 includes a first end 204 (e.g. a rounded end) and an opposing second end 226 (e.g., a substantially disc-shaped end). The first end 204 could be formed of a carbon-based material such as graphite or carbon fiber, or one or more of stainless steel, molybdenum, tungsten, or copper, for example. In some embodiments, the inner electrode 202 has a coating on its outer surface that includes an electrically conductive material having a melting point within a range of 180° C. to 800° C. (e.g., 180° C. to 550° C.) at 1 atmosphere of pressure. In various examples, the electrically conductive material can the take the form of eutectics, alloys, or mixtures of one or more of lithium, lead, or tin.

The intermediate electrode 205 includes a first end 227 (e.g., a substantially annular end) between the first end 220 of the outer electrode and the second end 222 of the outer electrode. The intermediate electrode 205 also includes an opposing second end 223 that is substantially annular.

The plasma confinement system 200 further includes a feeding mechanism 212 (e.g., an electromechanical system) that is configured to move the inner electrode 202 in or out of the plasma confinement system 200 along the longitudinal axis 206. During operation, the inner electrode 202 may become eroded by plasma discharge and the feeding mechanism 212 can be operated to feed in the inner electrode 202 to maintain the relative spacing between the inner electrode 202 and other components of the plasma confinement system 200.

The plasma confinement system 200 further includes a cooling system 214 (e.g., a heat exchanger) that is configured to cool the inner electrode 202 during operation of the plasma confinement system 200.

The outer electrode generally takes the form of an electrically conducting (e.g., stainless steel) shell having a substantially cylindrical body. The solid conductive shell 208 of the outer electrode includes a solid conductive outer shell 232 and a solid inner shell 234 (e.g., formed of electrically conductive material or high-resistivity material such as silicon carbide) that is disposed within the solid conductive outer shell 232 and in contact with the solid conductive outer shell 232. More specifically, the solid inner shell 234 includes an axial wall 236 that at least partially encircles the longitudinal axis 206 of the plasma confinement system 200 (e.g., partially encircles the inner electrode 202) and a radial wall 238 that couples the axial wall 236 to the solid conductive outer shell 232.

The outer electrode includes a first end 220 and an opposing second end 222. The rounded first end 204 of the inner electrode 202 is between the first end 220 (e.g., a substantially disc-shaped end) of the outer electrode and the second end 222 (e.g., a substantially circular or annular end) of the outer electrode. The radial wall 238 and a first end 220 of the outer electrode form a pool region 240 within the plasma confinement chamber 200. The pool region 240 serves as a reservoir for a substantial amount of the (e.g., liquid) electrically conductive material 210 that is in the plasma confinement chamber 200. As shown, the electrically conductive material 210 can also be circulated over the end 248 of the axial wall 236 by a pump 250 and/or a pump 256 as is discussed in more detail below.

The outer electrode (i.e., the solid conductive shell 208 and the electrically conductive material 210) surrounds much of the inner electrode 202. The inner electrode 202 and the outer electrode may be concentric and have radial symmetry with respect to the longitudinal axis 206.

The plasma confinement system 200 also includes a heat exchanger 242, a first port 244 configured to guide the electrically conductive material 210 from the heat exchanger 242 into the pool region 240, and a second port 246 configured to guide the electrically conductive material 210 from the pool region 240 to the heat exchanger 242. The heat exchanger 242 is configured to receive, via the second port 246, the electrically conductive material 210 that is heated within the plasma confinement system 200, extract heat from the electrically conductive material 210, and move (e.g., pump) the electrically conductive material 210 back into the pool region 240 via the first port 244 to be heated again by fusion reactions that take place in the plasma confinement system 200. In FIG. 2, the first port 244 is shown above the second port 246, however, in other examples the second port 246 could be above the first port 244. One of skill in the art will recognize that, in various examples, the ports 244 and 246 can have various relative positions.

As noted above, the axial wall 236 includes an end 248 that faces the second end 222 of the outer electrode. The plasma confinement system 200 also includes a first pump 250 configured to move the electrically conductive material 210 from the pool region 240 to a region 252 that is outside the axial wall 236 and separated from the pool region 240 by the radial wall 238. The first pump 250 is configured to move the electrically conductive material 210 over the end 248 of the axial wall 236 to a region 254 inside the axial wall 236.

The plasma confinement system 200 also includes a second pump 256 configured to move the electrically conductive material 210 from the pool region 240 to the region 252 that is outside the axial wall 236 and separated from the pool region 240 by the radial wall 238.

The plasma confinement system 200 also includes a pump 270 (e.g., a turbo-molecular pump) configured to pump air out of the plasma confinement system 200 such that the base pressure within the plasma confinement system 200 is within the range of $10^{-5}$ to $10^{-8}$ Torr.

The plasma confinement system 200 also includes one or more gas ports 216 configured to direct gas (e.g., tritium, deuterium, helium-3, hydrogen, a boron containing gas, or borane) from a gas source 228 (e.g., a pressurized gas tank) into an acceleration region 218 that is radially between the inner electrode 202 and the intermediate electrode 205. The acceleration region 218 has a substantially annular cross section defined by the shapes of the inner electrode 202 and the intermediate electrode 205. As shown in FIG. 2, the one or more gas ports 216 are positioned axially between the first end 204 of the inner electrode 202 and the second end 226 of the inner electrode 102.

The plasma confinement system 200 also includes a power supply 218 configured to apply a voltage between the inner electrode 102 and the intermediate electrode 205. The power supply 218 will generally take the form of a capacitor bank capable of storing up to 500 kJ or up to 3-4 MJ, for example. A positive terminal of the power supply 218 can be coupled to the inner electrode 102 or alternatively to the intermediate electrode 205.

The plasma confinement system 200 also includes a power supply 219 configured to apply a voltage between the inner electrode 202 and the outer electrode (e.g., the solid conductive shell 208). The power supply 219 will generally take the form of a capacitor bank capable of storing up to 500 kJ or up to 3-4 MJ, for example. A positive terminal of the power supply 219 can be coupled to the inner electrode 202 or alternatively to the outer electrode (e.g., the solid conductive shell 208).

The plasma confinement system 200 includes an assembly region 224 within the outer electrode between the first end 204 of the inner electrode 202 and the first end 220 of the outer electrode. The plasma confinement system 200 is configured to sustain a Z-pinch plasma within the assembly region 224 as described below.

The plasma confinement system 200 also includes an insulator 217 between the second end 223 of the intermediate electrode 205 and the inner electrode 202 to maintain electrical isolation between the inner electrode 202 and the intermediate electrode 205. The insulator 217 (e.g., a ceramic material) generally has an annular cross section.

The plasma confinement system 200 also includes an insulator 229 between the solid conductive shell 208 and the intermediate electrode 205 to maintain electrical isolation between the solid conductive shell 208 and the intermediate electrode 205. The insulator 229 (e.g., a ceramic material) generally has an annular cross section.

Figure 3:
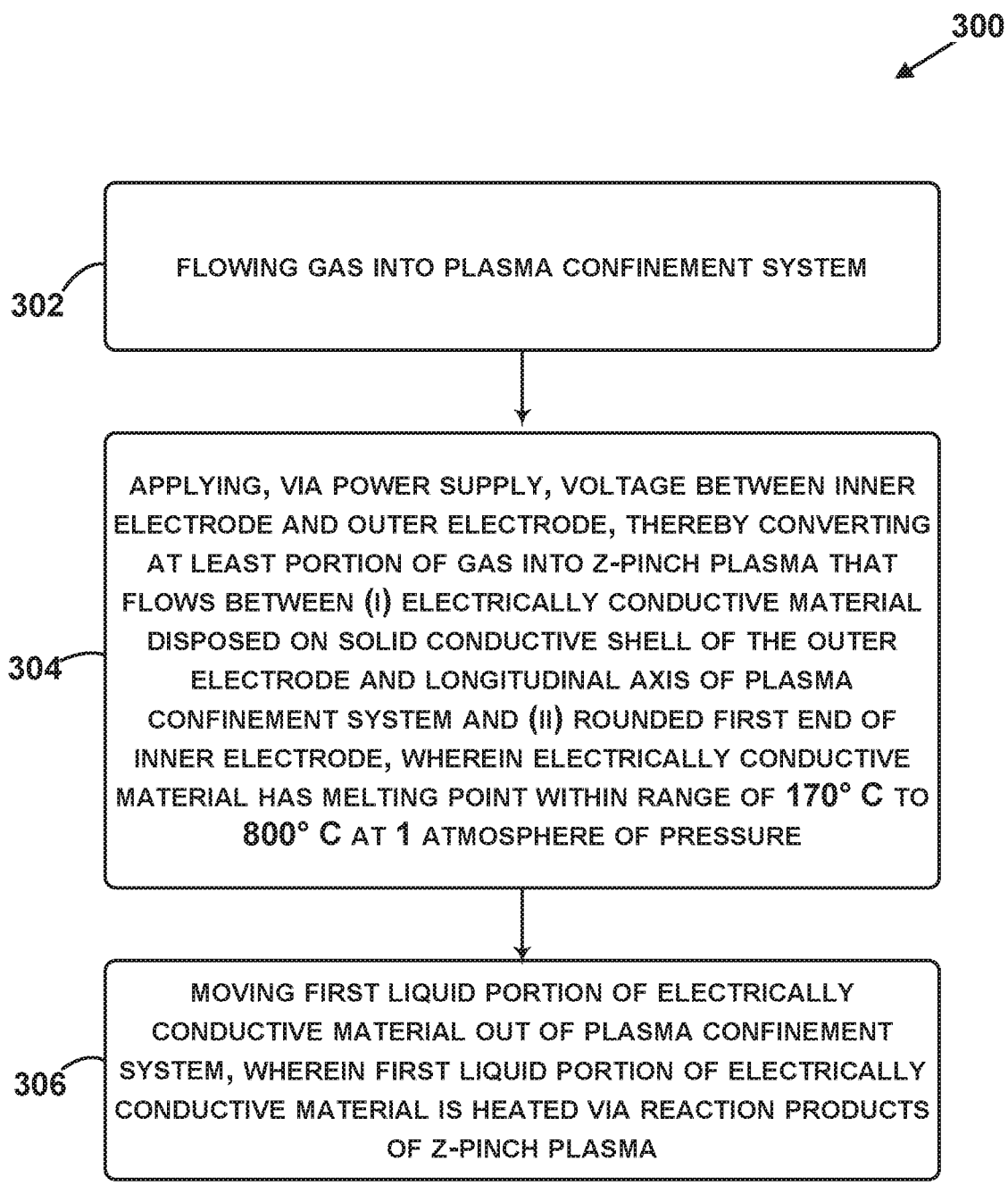
FIG. 3 is a block diagram of a method for operating a plasma confinement system, according to an example embodiment.

FIG. 3 is a block diagram of a method 300 for operating a plasma confinement system (e.g., the plasma confinement system 100). The plasma confinement system includes an inner electrode having a rounded first end that is disposed on a longitudinal axis of the plasma confinement system and an outer electrode that at least partially surrounds the inner electrode. FIGS. 4-9 illustrate some of the aspects of the method 300 as described below. Although FIGS. 4-9 show the longitudinal axis 106 of the plasma confinement system 100 aligned horizontally, in practice the longitudinal axis 106 generally will be aligned vertically.

At block 302, the method 300 includes flowing gas into the plasma confinement system.

Figure 4:
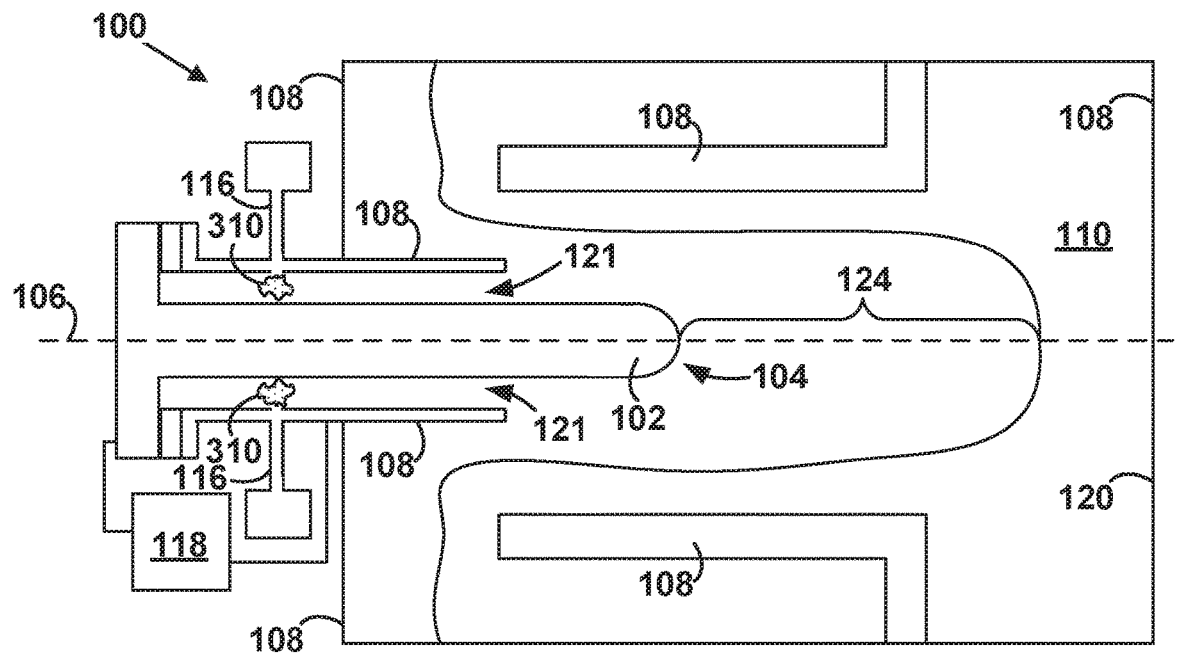
FIG. 4 illustrates some aspects of a plasma confinement system and a method for operation, according to an example embodiment.
Figure 5:
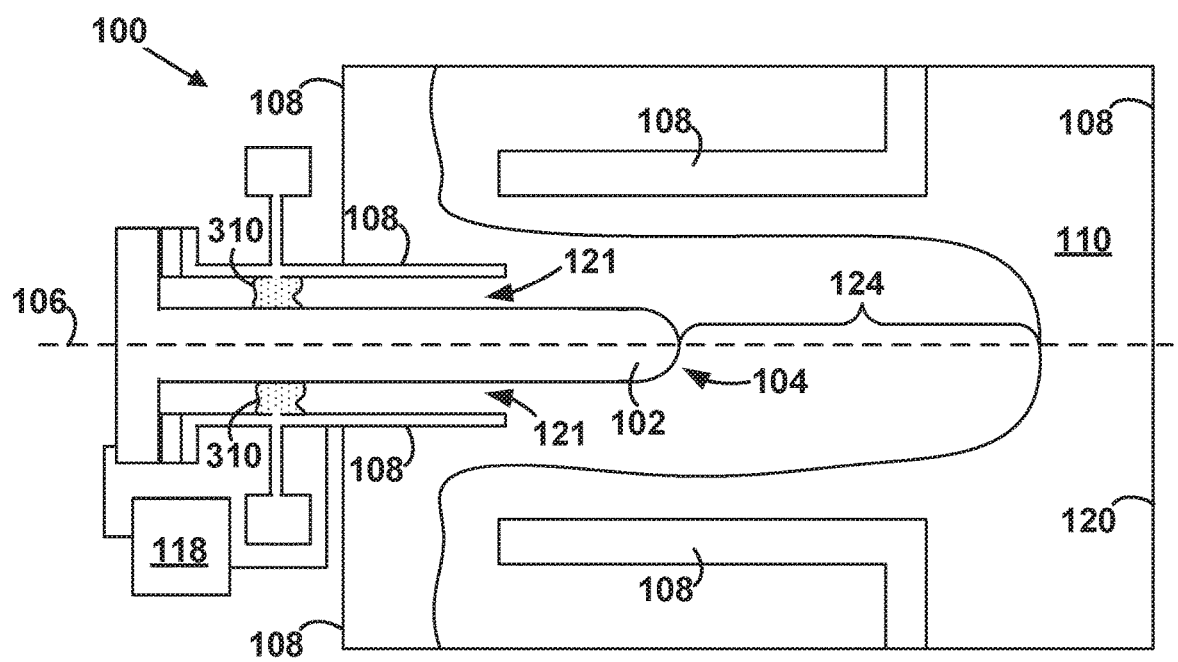
FIG. 5 illustrates some aspects of a plasma confinement system and a method for operation, according to an example embodiment.
Figure 6:
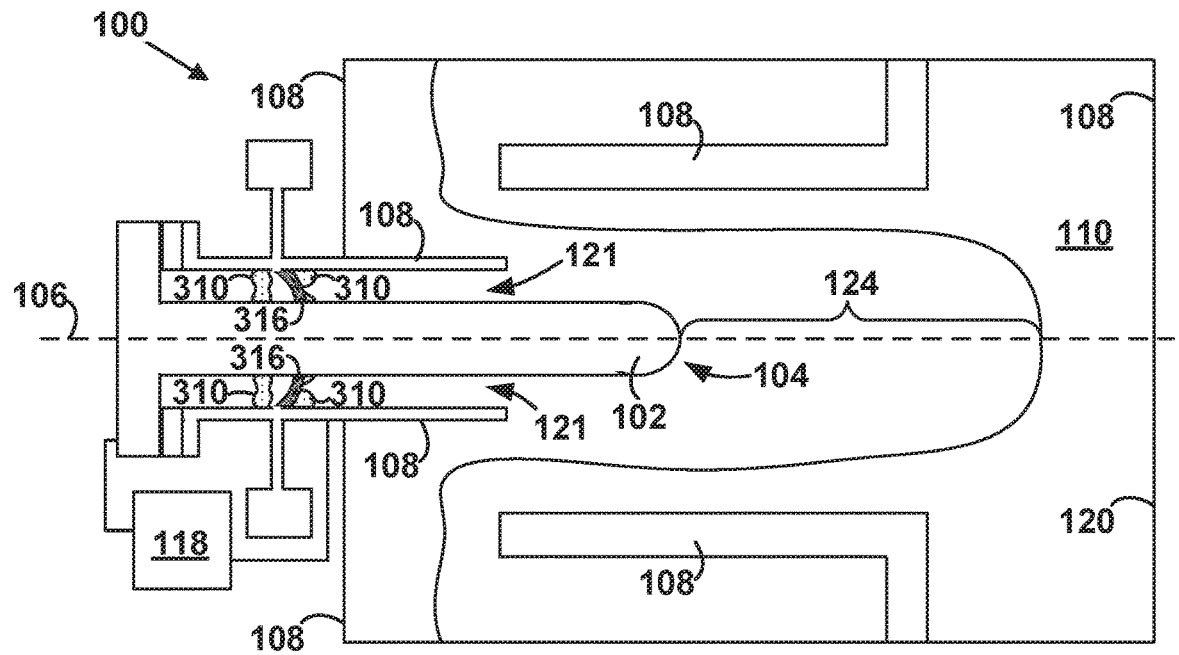
FIG. 6 illustrates some aspects of a plasma confinement system and a method for operation, according to an example embodiment.
Figure 7:
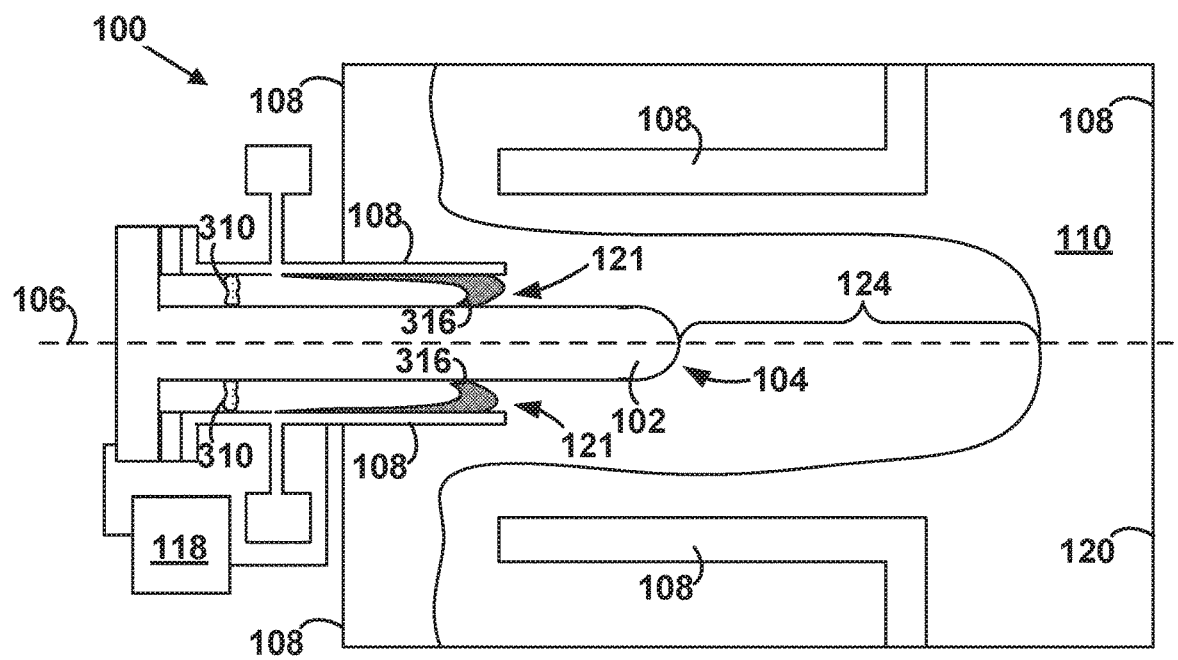
FIG. 7 illustrates some aspects of a plasma confinement system and a method for operation, according to an example embodiment.

As shown in FIG. 4 for example, the one or more gas ports 116 can direct gas 310 (e.g., one or more of tritium, deuterium, helium-3, hydrogen, a boron containing gas, or borane) into the acceleration region 121 between the inner electrode 102 and the outer electrode (e.g., the solid conductive shell 108) that substantially surrounds the inner electrode 102. FIG. 4 shows an initial amount of the gas 310 entering the acceleration region 121 and FIG. 5 shows an additional amount of the gas 310 entering the acceleration region 121 thereafter.

After flowing the gas 310, a gas pressure adjacent to the one or more gas ports 116 within the acceleration region 121 might be within a range of 1000 to 5800 Torr (e.g., 5450 to 5550 Torr) prior to the voltage between the inner electrode 102 and the outer electrode (e.g., the solid conductive shell 108) being applied via the power supply 118.

At block 304, the method 300 includes applying, via a power supply, a voltage between the inner electrode and the outer electrode, thereby converting at least a portion of the gas into a Z-pinch plasma that flows between (i) an electrically conductive material disposed on a solid conductive shell of the outer electrode and on the longitudinal axis of the plasma confinement system and (ii) the rounded first end of the inner electrode. The electrically conductive material has a melting point within a range of 170° C. to 800° C. (e.g., 180° C. to 550° C.) at 1 atmosphere of pressure.

Referring to FIGS. 6-9 for example, the power supply 118 can apply a voltage between the inner electrode 102 and the outer electrode (e.g., the solid conductive shell 108), thereby converting at least a portion of the gas 310 into a Z-pinch plasma 318 (see FIGS. 8-9) that flows between (i) the electrically conductive material 110 disposed on the solid conductive shell 108 of the outer electrode and on the longitudinal axis 106 of the plasma confinement system 100 and (ii) the rounded first end 104 of the inner electrode 102.

For example, the power supply 118 can apply the voltage between the inner electrode 102 and the solid conductive shell 108, thereby converting at least a portion of the gas 310 into a plasma 316 (see FIGS. 6-9) having a substantially annular cross section. Due to the magnetic field generated by its own current, the plasma 316 may flow axially within the acceleration region 121 toward the first end 104 of the inner electrode 102 and the first end 120 of the outer electrode as shown sequentially in FIGS. 6-9.

Figure 8:
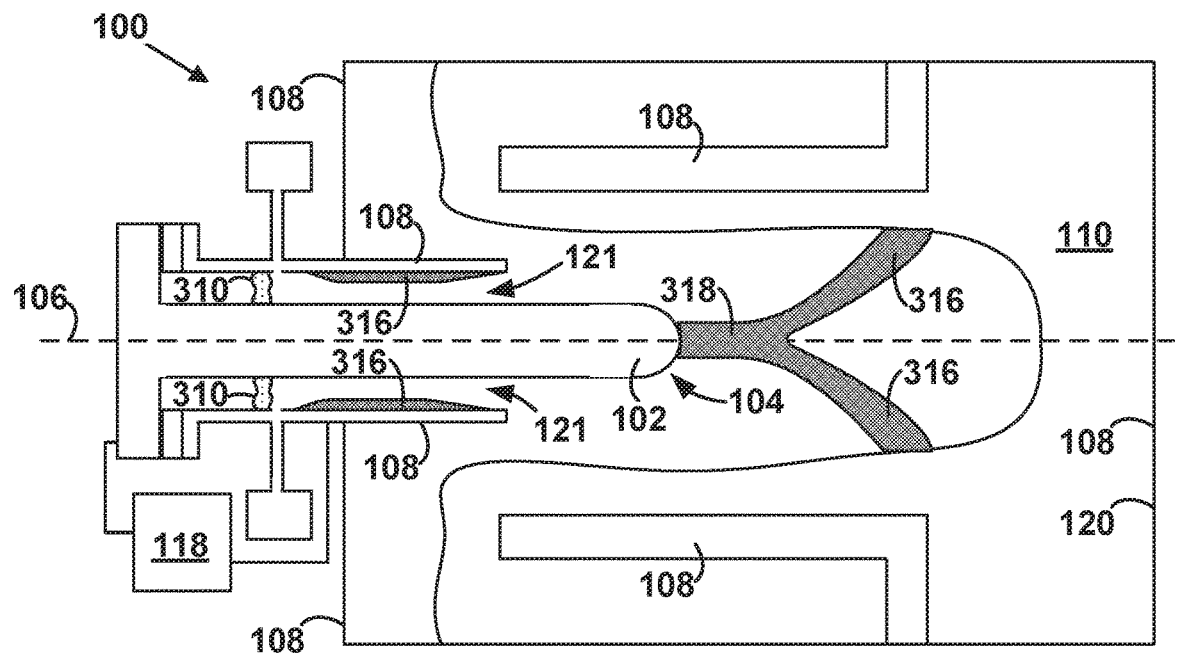
FIG. 8 illustrates some aspects of a plasma confinement system and a method for operation, according to an example embodiment.
Figure 9:
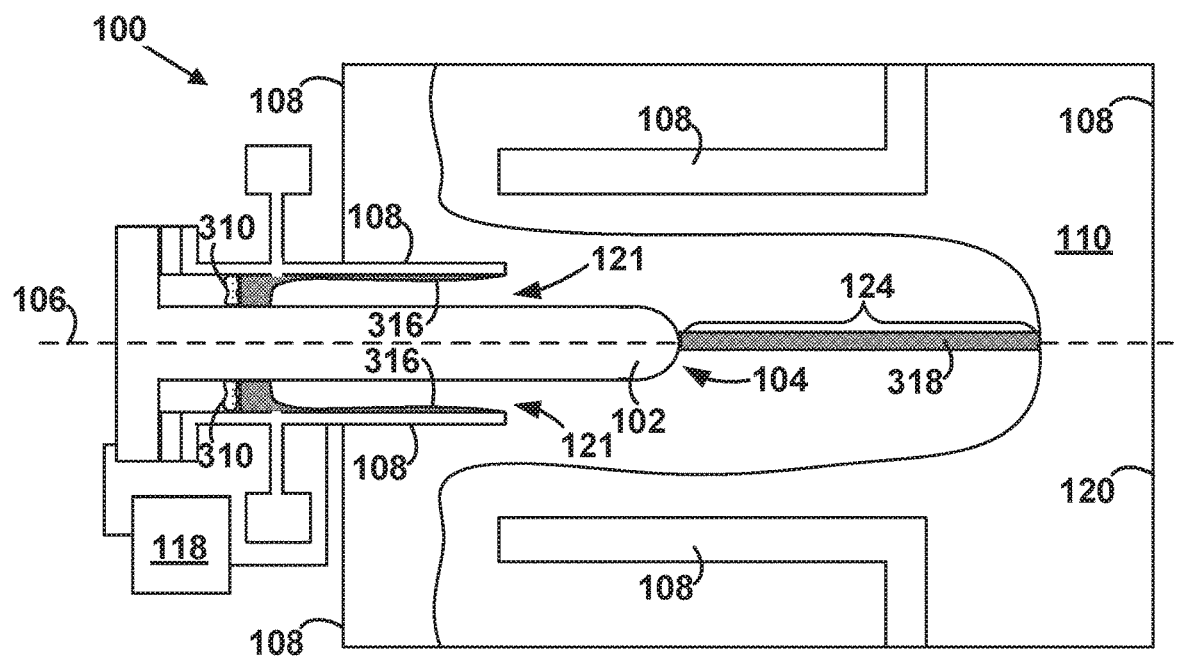
FIG. 9 illustrates some aspects of a plasma confinement system and a method for operation, according to an example embodiment.

As shown in FIGS. 8 and 9, when the plasma 316 moves beyond the acceleration region 121, the Z-pinch plasma 318 is established in the assembly region 124 within the outer electrode between (i) the electrically conductive material 110 disposed on the solid conductive shell 108 of the outer electrode and on the longitudinal axis 106 of the plasma confinement system 100 and (ii) the rounded first end 104 of the inner electrode 102.

The Z-pinch plasma 318 can exhibit sheared axial flow and have a radius between 0.1 mm and 5 mm, an ion temperature between 900 and 50,000 eV, an electron temperature greater than 500 eV (e.g., up to 50,000 eV), an ion number density greater than $1\times10^{23}$ ions/m$^3$, an electron number density of greater than $1\times10^{23}$ electrons/m$^3$, a magnetic field over 8 T, and/or may be stable for at least 10 μs.

At block 306, the method 300 includes moving a first liquid portion of the electrically conductive material out of the plasma confinement system. The first liquid portion of the electrically conductive material is heated via reaction products (e.g., neutrons and other energetic particles) of the Z-pinch plasma.

The heat exchanger 142 can receive (e.g., pump), via the second port 146, a portion of the electrically conductive material 110 that is heated within the plasma confinement system 100, extract heat from the electrically conductive material 110, and move (e.g., pump) the electrically conductive material 110 back into the pool region 140 via the first port 144 to be heated again by fusion reactions that take place in the plasma confinement system 100. Prior to forming a plasma discharge within the plasma confinement system 100, the electrically conductive material 110 is generally heated (e.g., melted) into a liquid state using a (e.g., electric) heating element disposed within the plasma confinement system 100.

The plasma confinement system 100 includes a feeding mechanism 112 (e.g., an electromechanical system) that can move the inner electrode 102 in or out of the plasma confinement system 100 along the longitudinal axis 106. During operation, the inner electrode 102 may become eroded by plasma discharge and the feeding mechanism 112 can be operated to feed in the inner electrode 102 to maintain the relative spacing between the inner electrode 102 and other components of the plasma confinement system 100.

In addition, the pumps 150 and 156 can move or circulate the electrically conductive material 110 over the outer electrode (e.g., over the solid conductive shell 108) so that different portions of the electrically conductive material 110 can be used to absorb current and/or heat (e.g., at the longitudinal axis 106) from the Z-pinch plasma 318 over time. During operation of the plasma confinement system 100, much of or all of the electrically conductive material 110 will generally be in a liquid state.

In some embodiments, the pumps 150 and 156 move the electrically conductive material 110 such that the electrically conductive material 110 moved over the outer electrode (e.g., over the solid conductive shell 108) is moved in an azimuthal direction (e.g., around the longitudinal axis 106) and/or an axial direction with respect to the longitudinal axis 106 of the plasma confinement system 100.

More specifically, the pumps 150 or 156 can move the electrically conductive material 110 from the pool region 140 to a region 152 that is outside the axial wall 136 and separated from the pool region 140 by the radial wall 138. Additionally, the pumps 150 or 156 can move the electrically conductive material 110 over the end 148 of the axial wall 136 to a region 154 inside the axial wall 136, and back toward the pool region 140.

In various embodiments, the voltage applied between the inner electrode 102 and the outer electrode (e.g., the solid conductive shell 108) is within a range of 2 kV to 30 kV. The voltage applied between the inner electrode and the outer electrode (e.g., the solid conductive shell 108) can result in a radial electric field within a range of 30 kV/m to 500 kV/m.

In some embodiments, the Z-pinch plasma 318 has a radius between 0.1 mm and 5 mm, an ion temperature between 900 and 50,000 eV, and an electron temperature greater than 500 eV (e.g., up to 50,000 eV). The Z-pinch plasma 318 can have an ion number density greater than $1 \times 10^{23}$ ions/m$^3$ or an electron number density of greater than $1 \times 10^{23}$ electrons/m$^3$, and can exhibit sheared flow with a magnetic field of over 8 T. The Z-pinch plasma 318 can exhibit stability for at least 10 µs.

In some embodiments, the reaction products of the Z-pinch plasma 318 include neutrons. As such, during operation of the plasma confinement system 100, neutrons and a portion of the electrically conductive material 110 can be consumed to generate additional tritium fuel for recovery at the heat exchanger 142. The reactive nature of the electrically conductive material 110 can also serve to reduce the base pressure within the plasma confinement system 100 by capturing vapor particles.

Some embodiments include controlling a thickness of the electrically conductive material 110 on the solid conductive shell 108 by adjusting a rate at which the heat exchanger 142 moves the electrically conductive material 110 into the pool region 140 from the heat exchanger 142 or by adjusting a rate at which the electrically conductive material 110 moves to the heat exchanger 142 from the pool region 140. Increasing the rate at which the electrically conductive material 110 flows into the pool region 140 will generally increase the thickness of the electrically conductive material 110 on the solid conductive shell 108. Increasing the rate at which the electrically conductive material 110 flows out of the pool region 140 to the heat exchanger 142 will generally decrease the thickness of the electrically conductive material 110 on the solid conductive shell 108.

Figure 10:
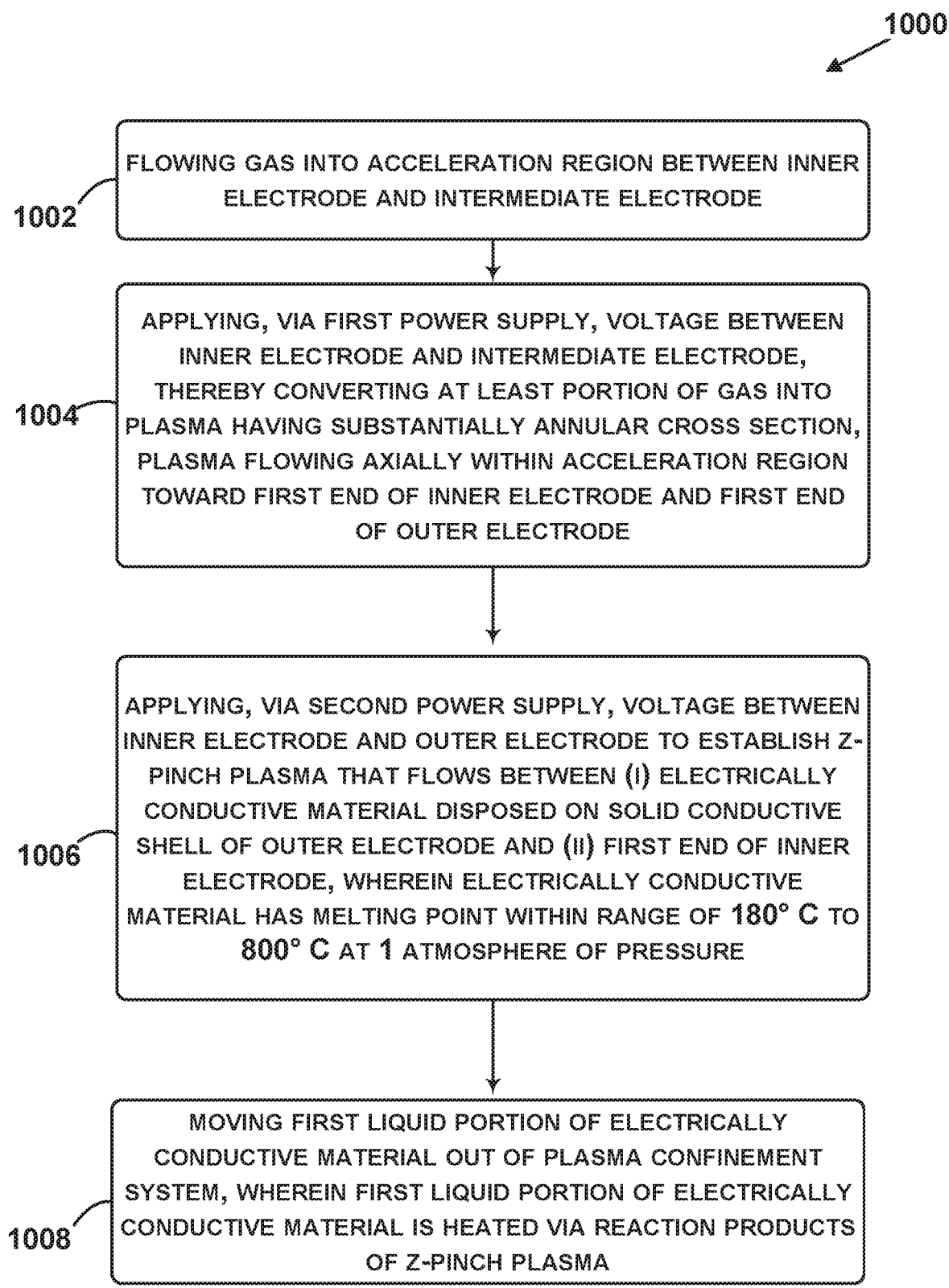
FIG. 10 is a block diagram of a method for operating a plasma confinement system, according to an example embodiment.

FIG. 10 is a block diagram of a method 1000 for operating a plasma confinement system (e.g., the plasma confinement system 200). The plasma confinement system includes an inner electrode, an intermediate electrode that at least partially surrounds the inner electrode, and an outer electrode that at least partially surrounds the intermediate electrode. FIGS. 11-16 illustrate some of the aspects of the method 1000 as described below. Although FIGS. 11-16 show the longitudinal axis 206 of the plasma confinement system 200 aligned horizontally, in practice the longitudinal axis 206 generally will be aligned vertically At block 1002, the method 1000 includes flowing gas into an acceleration region between the inner electrode and the intermediate electrode.

Figure 11:
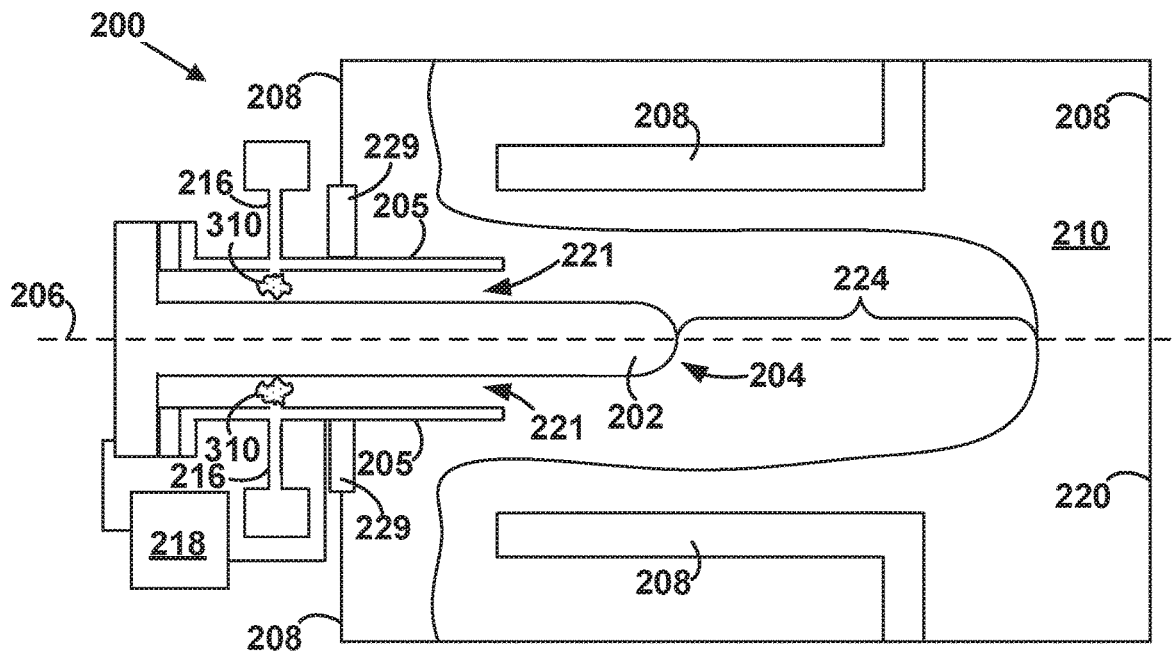
FIG. 11 illustrates some aspects of a plasma confinement system and a method for operation, according to an example embodiment.
Figure 12:
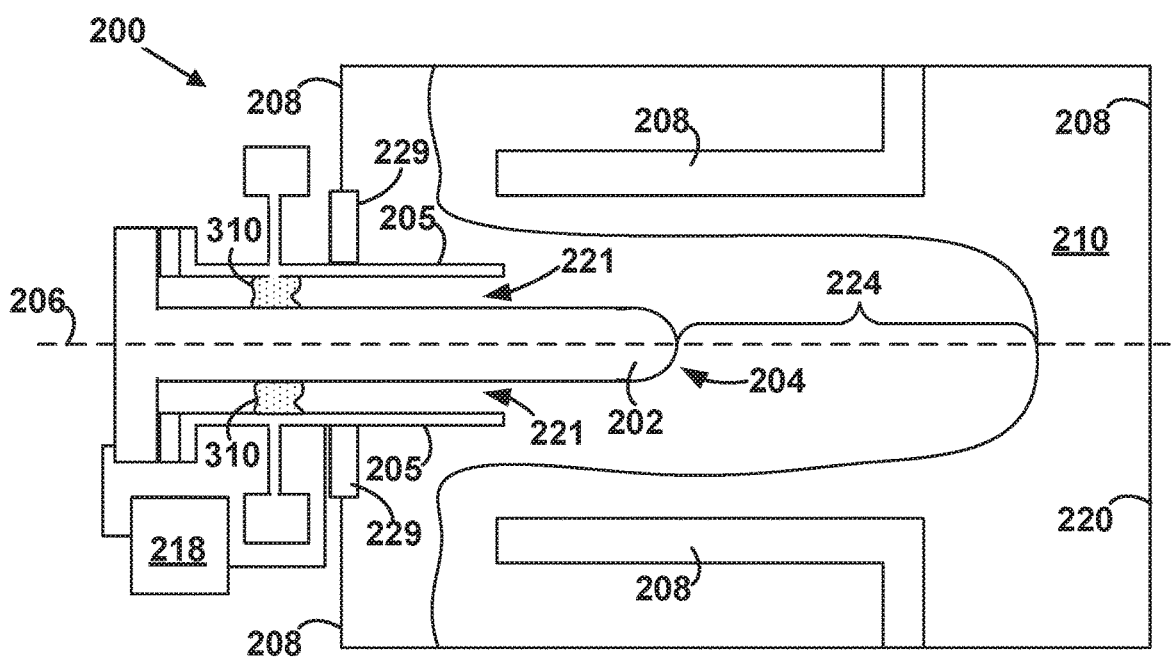
FIG. 12 illustrates some aspects of a plasma confinement system and a method for operation, according to an example embodiment.
Figure 13:
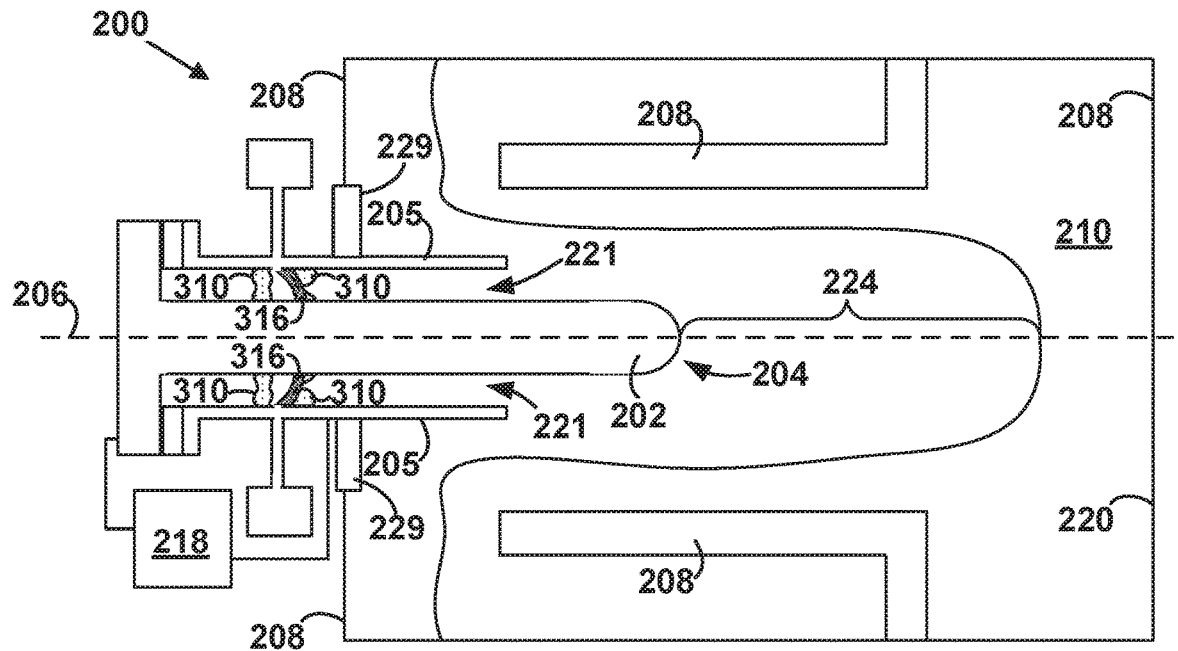
FIG. 13 illustrates some aspects of a plasma confinement system and a method for operation, according to an example embodiment.
Figure 14:
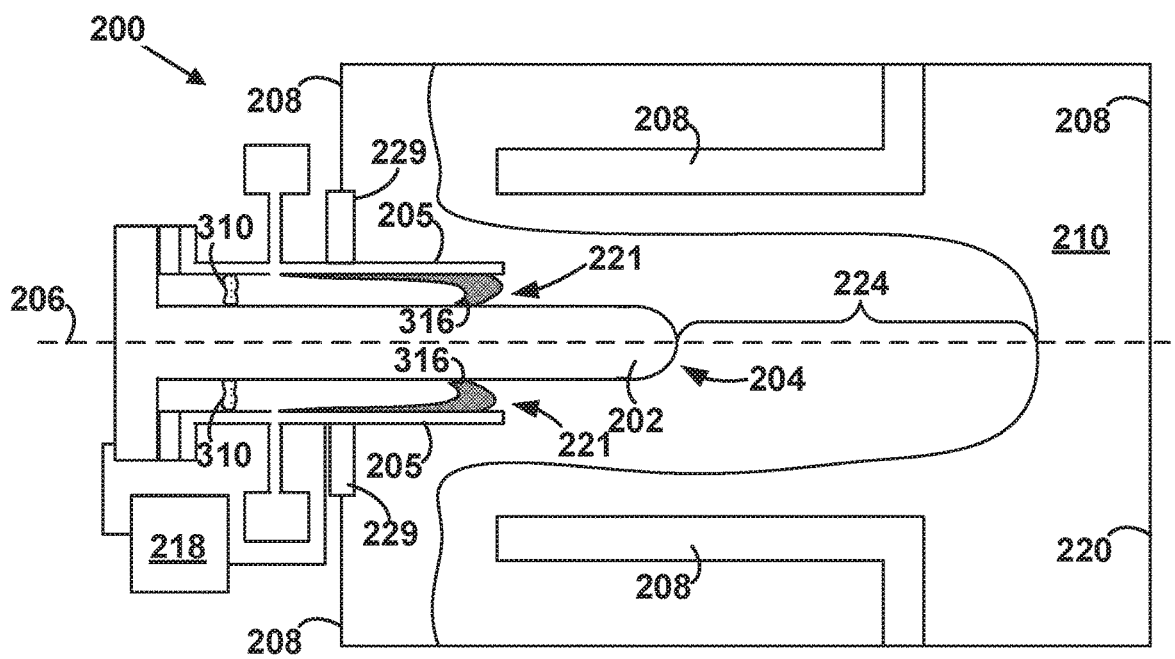
FIG. 14 illustrates some aspects of a plasma confinement system and a method for operation, according to an example embodiment.

As shown in FIG. 11 for example, the one or more gas ports 216 can direct gas 310 (e.g., one or more of tritium, deuterium, helium-3, hydrogen, a boron containing gas, or borane) into the acceleration region 221 between the inner electrode 202 and the intermediate electrode 205 that partially surrounds the inner electrode 202. FIG. 11 shows an initial amount of the gas 310 entering the acceleration region 221 and FIG. 12 shows an additional amount of the gas 310 entering the acceleration region 221 thereafter.

After flowing the gas 310, a gas pressure adjacent to the one or more gas ports 216 within the acceleration region 221 might be within a range of 1000 to 5800 Torr (e.g., 5450 to 5550 Torr) prior to the voltage between the inner electrode 202 and the intermediate electrode 205 being applied via the power supply 218.

At block 1004, the method 1000 includes applying, via a first power supply, a voltage between the inner electrode and the intermediate electrode, thereby converting at least a portion of the gas into a plasma having a substantially annular cross section, the plasma flowing axially within the acceleration region toward a first end of the inner electrode and a first end of the outer electrode.

Referring to FIGS. 11-14 for example, the power supply 218 can apply a voltage between the inner electrode 202 and the intermediate electrode 205, thereby converting at least a portion of the gas 310 into a plasma 316 having a substantially annular cross section. The plasma 316 can flow axially within the acceleration region 221 toward a first end 204 of the inner electrode 202 and a first end 220 of the outer electrode. Due to the magnetic field generated by its own current, the plasma 316 can flow axially within the acceleration region 121 toward the first end 204 of the inner electrode 202 and the first end 220 of the outer electrode as shown sequentially in FIGS. 11-14.

At block 1006, the method 1000 includes applying, via a second power supply, a voltage between the inner electrode and the outer electrode to establish a Z-pinch plasma that flows between (i) an electrically conductive material disposed on a solid conductive shell of the outer electrode and (ii) the first end of the inner electrode. The electrically conductive material has a melting point within a range of 180° C. to 800° C. (e.g., 180° C. to 550° C.) at 1 atmosphere of pressure.

Figure 15:
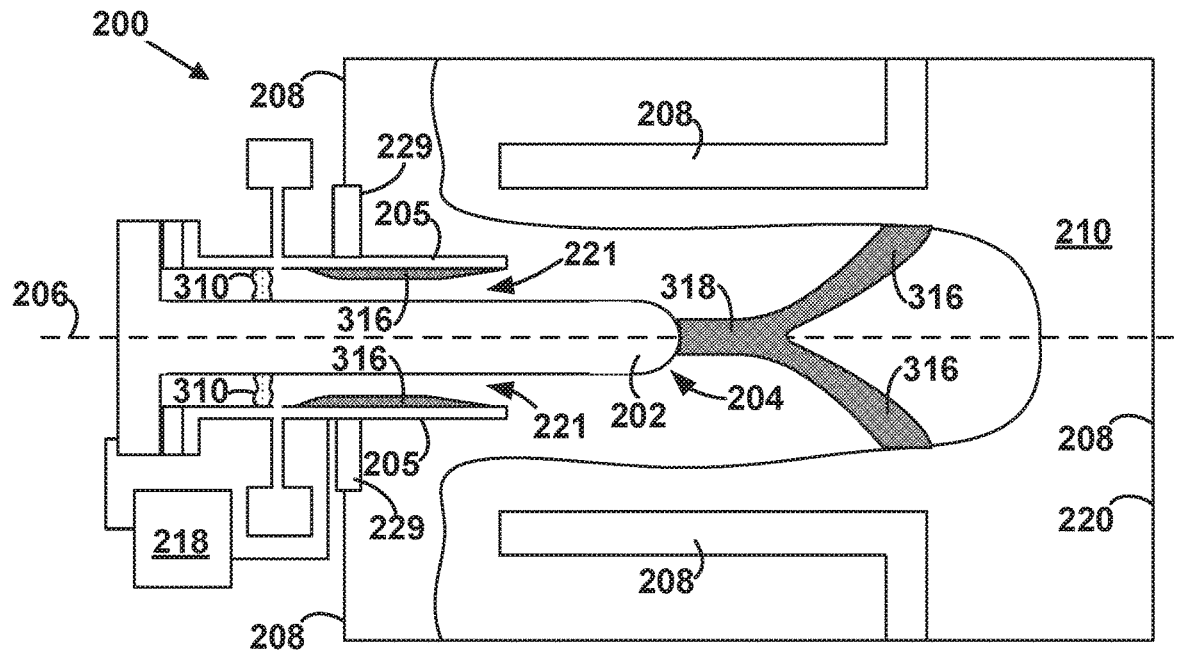
FIG. 15 illustrates some aspects of a plasma confinement system and a method for operation, according to an example embodiment.
Figure 16:
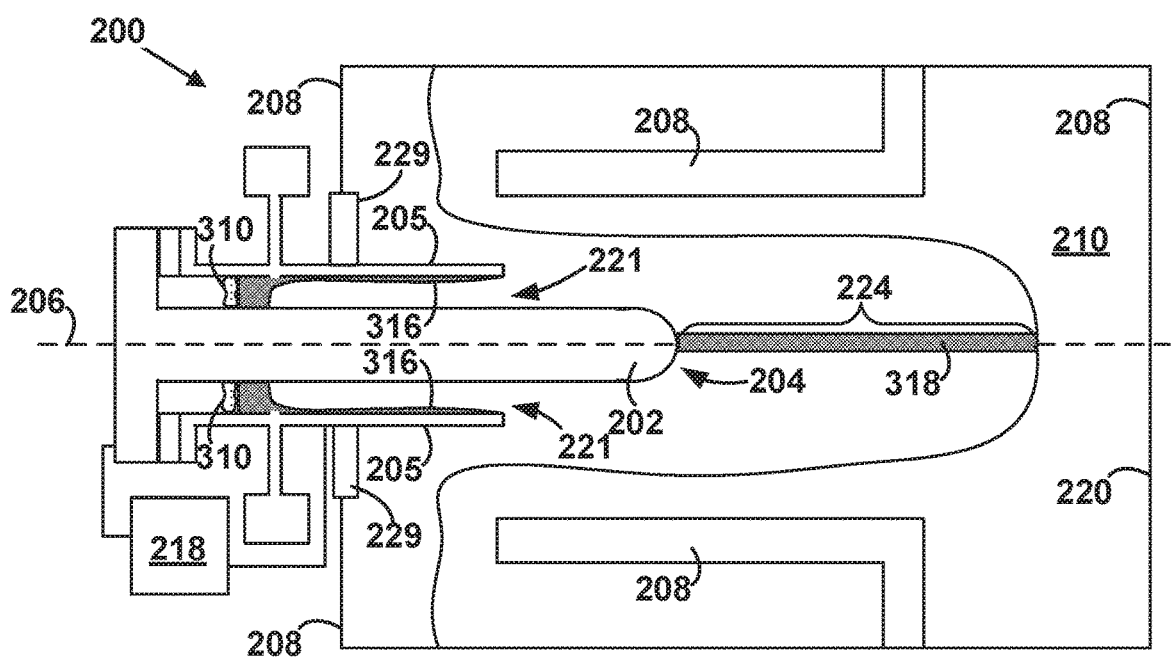
FIG. 16 illustrates some aspects of a plasma confinement system and a method for operation, according to an example embodiment.

Referring to FIGS. 15 and 16 for example, the power supply 219 can apply a voltage between the inner electrode 202 and the outer electrode (e.g., the solid conductive shell 208) to establish the Z-pinch plasma 318 that flows between (i) the electrically conductive material 210 disposed on the solid conductive shell 208 of the outer electrode and (ii) the first end 204 of the inner electrode 202. The electrically conductive material 210 has a melting point within a range of 180° C. to 800° C. (e.g., 180° C. to 550° C.) at 1 atmosphere of pressure.

As shown in FIGS. 15 and 16, when the plasma 316 moves beyond the acceleration region 221, the Z-pinch plasma 318 is established in the assembly region 224 within the outer electrode between (i) the electrically conductive material 210 disposed on the solid conductive shell 208 of the outer electrode and on the longitudinal axis 206 of the plasma confinement system 200 and (ii) the rounded first end 204 of the inner electrode 202.

The Z-pinch plasma 318 can exhibit sheared axial flow and have a radius between 0.1 mm and 5 mm, an ion temperature between 900 and 50,000 eV, an electron temperature greater than 500 eV (e.g., up to 50,000 eV), an ion number density greater than $1 \times 10^{23}$ ions/m$^3$, an electron number density of greater than $1 \times 10^{23}$ electrons/m$^3$, a magnetic field over 8 T, and/or may be stable for at least 10 µs.

At block 1008, the method 1000 includes moving a first liquid portion of the electrically conductive material out of the plasma confinement system. The first liquid portion of the electrically conductive material is heated via reaction products of the Z-pinch plasma.

Referring to FIG. 2 for example, the heat exchanger 242 can receive (e.g., pump), via the second port 246, a portion of the electrically conductive material 210 that is heated within the plasma confinement system 200, extract heat from the electrically conductive material 210, and move (e.g., pump) the electrically conductive material 210 back into the pool region 240 via the first port 244 to be heated again by fusion reactions that take place in the plasma confinement system 200. Prior to forming a plasma discharge within the plasma confinement system 200, the electrically conductive material 210 is generally heated (e.g., melted) into a liquid state using a (e.g., electric) heating element disposed within the plasma confinement system 200.

The plasma confinement system 200 includes a feeding mechanism 212 (e.g., an electromechanical system) that can move the inner electrode 202 in or out of the plasma confinement system 200 along the longitudinal axis 206. During operation, the inner electrode 202 may become eroded by plasma discharge and the feeding mechanism 212 can be operated to feed in the inner electrode 202 to maintain the relative spacing between the inner electrode 202 and other components of the plasma confinement system 200.

In addition, the pumps 250 and 256 can move or circulate the electrically conductive material 210 over the outer electrode (e.g., over the solid conductive shell 208) so that different portions of the electrically conductive material 210 can be used to absorb current and/or heat (e.g., at the longitudinal axis 206) from the Z-pinch plasma 318 over time. During operation of the plasma confinement system 200, much of or all of the electrically conductive material 210 will generally be in a liquid state.

In some embodiments, the pumps 250 and 256 move the electrically conductive material 210 such that the electrically conductive material 210 moved over the outer electrode (e.g., over the solid conductive shell 208) is moved in an azimuthal direction (e.g., into and/or out of the page) and/or an axial direction with respect to the longitudinal axis 206 of the plasma confinement system 100.

More specifically, the pumps 250 or 256 can move the electrically conductive material 210 from the pool region 240 to a region 252 that is outside the axial wall 236 and separated from the pool region 240 by the radial wall 238. Additionally, the pumps 250 or 256 can move the electrically conductive material 210 over the end 248 of the axial wall 236 to a region 254 inside the axial wall 236, and back toward the pool region 240.

In various embodiments, the voltage applied between the inner electrode 202 and the outer electrode (e.g., the solid conductive shell 108) or between the inner electrode 202 and the intermediate electrode 205 is within a range of 2 kV to 30 kV. The voltage applied can result in electric fields within a range of 30 kV/m to 500 kV/m.

In some embodiments, the Z-pinch plasma 318 has a radius between 0.1 mm and 5 mm, an ion temperature between 900 and 50,000 eV, and an electron temperature greater than 500 eV (e.g., up to 50,000 eV). The Z-pinch plasma 318 can have an ion number density greater than $1 \times 10^{23}$ ions/m$^3$ or an electron number density of greater than $1 \times 10^{23}$ electrons/m$^3$, and can exhibit sheared flow with a magnetic field of over 8 T. The Z-pinch plasma 318 can exhibit stability for at least 10 µs.

In some embodiments, the reaction products of the Z-pinch plasma 318 include neutrons. As such, during operation of the plasma confinement system 200, neutrons and a portion of the electrically conductive material 210 can be consumed to generate additional tritium fuel for recovery at the heat exchanger 242. The reactive nature of the electrically conductive material 210 can also serve to reduce the base pressure within the plasma confinement system 200 by capturing vapor particles.

Some embodiments include controlling a thickness of the electrically conductive material 210 on the solid conductive shell 208 by adjusting a rate at which the heat exchanger 242 moves the electrically conductive material 210 into the pool region 240 from the heat exchanger 242 or by adjusting a rate at which the electrically conductive material 210 moves to the heat exchanger 242 from the pool region 240. Increasing the rate at which the electrically conductive material 210 flows into the pool region 240 will generally increase the thickness of the electrically conductive material 210 on the solid conductive shell 208. Increasing the rate at which the electrically conductive material 210 flows out of the pool region 240 to the heat exchanger 242 will generally decrease the thickness of the electrically conductive material 210 on the solid conductive shell 208.

While various example aspects and example embodiments have been disclosed herein, other aspects and embodiments will be apparent to those skilled in the art. The various example aspects and example embodiments disclosed herein are for purposes of illustration and are not intended to be limiting, with the true scope and spirit being indicated by the following claims.

The invention claimed is:

1. A plasma confinement system comprising:
   an inner electrode;
   an intermediate electrode that at least partially surrounds the inner electrode; and
   an outer electrode that at least partially surrounds the intermediate electrode, the outer electrode comprising:
   a solid conductive shell comprising:
   a solid conductive outer shell; and
   a solid inner shell that is disposed within the solid conductive outer shell and in contact with the solid conductive outer shell,
   wherein the solid inner shell comprises:
   an axial wall that at least partially encircles a longitudinal axis of the plasma confinement system; and
   a radial wall that couples the axial wall to the solid conductive outer shell,
   wherein the radial wall and a first end of the outer electrode form a pool region,
   an electrically conductive material disposed on the solid conductive shell, wherein the electrically conductive material has a melting point within a range of 180° C. to 800° C. at 1 atmosphere of pressure; and
   a pumping system configured to circulate the electrically conductive material over the outer electrode when the electrically conductive material is in a liquid state.

2. The plasma confinement system of claim 1, further comprising a feeding mechanism that is configured to move the inner electrode along the longitudinal axis of the plasma confinement system.

3. The plasma confinement system of claim 1, further comprising a cooling system that is configured to cool the inner electrode during operation of the plasma confinement system.

4. The plasma confinement system of claim 1, further comprising:
   a first power supply configured to apply a voltage between the inner electrode and the intermediate electrode; and
   a second power supply configured to apply a voltage between the inner electrode and the outer electrode.

5. The plasma confinement system of claim 1, wherein the electrically conductive material comprises one or more of lithium, lead, or tin.

6. The plasma confinement system of claim 1, the inner electrode having a first end that is at least partially surrounded by the outer electrode, wherein the plasma confinement system is configured to maintain a Z-pinch plasma between the first end of the inner electrode and the electrically conductive material.

7. The plasma confinement system of claim 1,
   further comprising:
   a heat exchanger; and
   a first port configured to guide the electrically conductive material from the heat exchanger into the pool region.

8. The plasma confinement system of claim 1, wherein the pumping system is configured to circulate the electrically conductive material such that movement of the electrically conductive material includes one or more of an azimuthal component or an axial component with respect to the longitudinal axis of the plasma confinement system.

9. The plasma confinement system of claim 1, a first end of the inner electrode being formed of graphite or carbon fiber.

10. The plasma confinement system of claim 1, further comprising one or more gas ports configured to direct gas into an acceleration region between the inner electrode and the intermediate electrode.

11. The plasma confinement system of claim 1, wherein the plasma confinement system allows current to flow between the inner electrode and the outer electrode through both a Z-pinch plasma and the electrically conductive material.

12. The plasma confinement system of claim 1, the inner electrode having a first end that is at least partially surrounded by the outer electrode.

13. The plasma confinement system of claim 12, wherein the first end of the inner electrode is rounded.

14. The plasma confinement system of claim 1, further comprising an insulator between a second end of the outer electrode and the intermediate electrode.

15. The plasma confinement system of claim 14, wherein the plasma confinement system is configured to maintain a Z-pinch plasma between a first end of the inner electrode and the electrically conductive material on the longitudinal axis of the plasma confinement system.

16. The plasma confinement system of claim 15, wherein the Z-pinch plasma has axial flow that varies in a radial direction.

17. The plasma confinement system of claim 7, the axial wall comprising an end that faces a second end of the outer electrode, the plasma confinement system further comprising:
a first pump configured to move the electrically conductive material from the pool region to a region that is outside the axial wall and separated from the pool region by the radial wall.

18. The plasma confinement system of claim 17, the plasma confinement system further comprising:
a second pump configured to move the electrically conductive material from the pool region to the region that is outside the axial wall and separated from the pool region by the radial wall.

19. The plasma confinement system of claim 1, wherein the intermediate electrode forms a cavity and the inner electrode is positioned at least partially within the cavity.

20. The plasma confinement system of claim 19, the inner electrode having a first end that is at least partially surrounded by the outer electrode.

* * * * *